APPARATUS FOR PULSE-WIDTH DISCRIMINATION

Filed June 6, 1958

Inventor:
Jay G. Levinthal,
by Allen E. Amgott
His Attorney.

United States Patent Office 3,015,779

Patented Jan. 2, 1962

3,015,779

APPARATUS FOR PULSE-WIDTH DISCRIMINATION

Jay G. Levinthal, Sunnyvale, Calif., assignor to General Electric Company, a corporation of New York Filed June 6, 1958, Ser. No. 740,390
6 Claims. (Cl. 328—112)

The present invention relates to pulse-width discrimination circuitry for use in infrared search equipments and more particularly to pulse amplifiers, the gain of which varies inversely with the width of input signals.

There exists a need in many applications to transform the shape and character of an incoming signal into a signal, the amplitude of which is proportional to the amplitude of said incoming signal and inversely proportional to the pulse width thereof. Various electronic circuits have been designed to accomplish these results to a limited extent by utilization of delay lines of the open-ended type. However, these circuits are not particularly suitable for use with incoming signals having wide pulse widths in the millisecond region and longer.

Therefore, it is a primary object of the present invention to provide a pulse-width discrimination means and method for producing an output pulse the amplitude of which is a function of both the amplitude and pulse width of an incoming signal.

Another object of this invention is to provide pulse amplifier means capable of producing an output pulse, the amplitude of which is proportional to the amplitude of the input pulse and inversely proportional ot the width of said input pulse.

A further object of the invention is to provide pulse-length discrimination means for producing an output signal that is to be a maximum at a predetermined pulse width.

Figure 1:
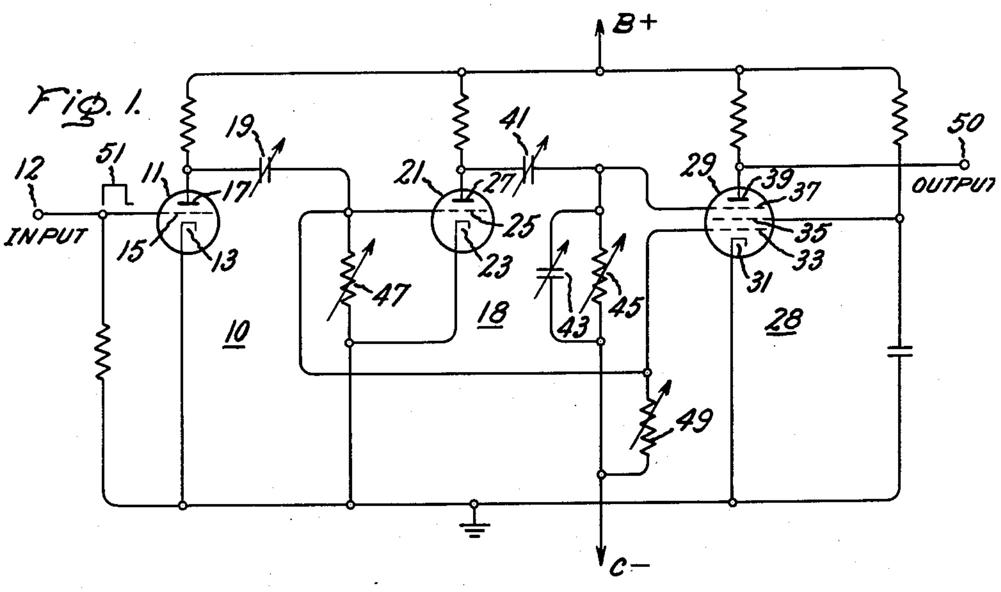
Figure 2:
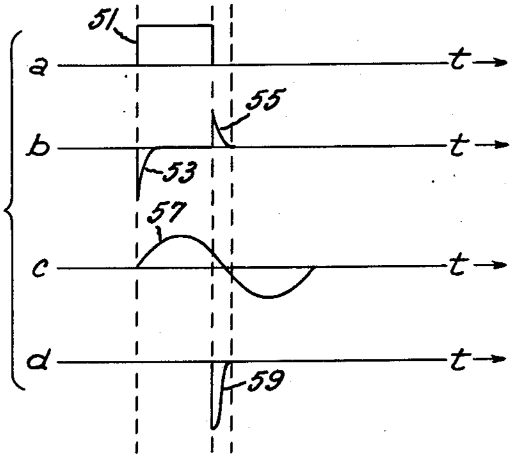
Figure 3:
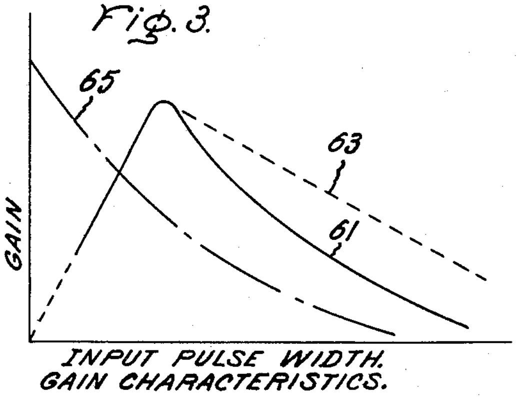

Other objects and many of the attendant advantages of this invention will be readily appreciated as the same becomes better understood by reference to the following detailed description when considered in connection with the accompanying drawings wherein:

FIGURE 1 is a schematic diagram of the apparatus and circuitry illustrating an embodiment of a pulse amplifier for converting an incoming signal to one that is proportional in amplitude but inversely proportional to the width of said incoming signal;

FIGURES 2*a*, 2*b*, 2*c* and 2*d* are oscillograms showing wave forms produced in the operation of FIGURE 1; and FIGURE 3 is a graphical presentation of a typical plot of gain versus pulse width of the embodiment of FIGURE 1.

As mentioned hereinbefore, in certain types of electronic equipments, it is desirable to modify the shape and character of incoming signals into other types of signals that are more suitable for specific purposes. This is especially true in the field of detection devices such as infrared search equipments. To permit pulse-width discrimination for detection devices, it is necessary to alter the amplitude of the received signal by an amount that is inversely proportional to the width of the received pulse. In conventional circuitry that has been employed for pulse-width discrimination, the operation involved either the generation of a new pulse only when the received signal was narrower in width than a critical value, or, the received signal was sent through a high-pass filter wherein the longer pulses that were rich in low-frequency components lost a considerable portion of their energy. Neither of the above methods entirely performed the required function, the first mentioned circuitry was in the nature of a "yes-no" device and not a proportional one. The latter circuitry changed the shape of the pulse but not its amplitude.

In order to provide proper pulse-width discrimination, the system must be designed so that the output pulse becomes smaller as the length of the received signal increases. Thus, no output signal will be presented until the duration of the input signal is determined. In addition, the circuitry must be capable of estimating the time separation of the start and finish of the received signal and thereafter act accordingly.

Several methods of accomplishing the desired results have been successfully developed. One technique is to produce a high voltage at the start of the received pulse that falls as time elapses. The voltage existing at the end of the received pulse is then presented as the output amplitude. A second method, that will be discussed in detail, hereinafter, is to generate a marker or differential pulse at the start of the received pulse and delay this marker pulse by a known amount of time. A second marker or differential pulse is generated at the end of the received pulse and comparison of the delayed marker pulse is made therewith.

In brief, one embodiment of apparatus employed comprises a plurality of thermionic stages in combination with a high-pass and low-pass filter, one of said thermionic stages acting as an amplifier, one as an inverter and the other as a coincidence detector. The circuitry is designed so that the later the end of the received pulse, the less coincidence that exists between the delayed starting marker and the terminating marker and the lower the output of the coincidence detector.

In the FIGURE 1 embodiment of the invention, there is shown an amplifier stage 10 comprising a triode 11, having a cathode electrode 13, a control grid electrode 15 and a plate electrode 17. Said amplifier stage is capacitively coupled to an inverter stage 18 by means of variable condenser 19. Inverter stage 18 includes a triode 21 having a cathode electrode 23, a control grid electrode 25 and a plate electrode 27. A coincidence stage 28 comprising a pentode 29 having a cathode electrode 31, a control grid electrode 33, a screen grid electrode 35, a suppressor electrode 37 and a plate electrode 39 is coupled to the output of amplifier stage 10 by means of condenser 19 connected between plate 17 and grid 33 and, in addition, is coupled to the output of inverter stage 18 by means of condenser 41 connected between plate 27 and suppressor grid 37.

A parallel resistance-capacitance network comprising variable resistor 45 and variable condenser 43 is inserted between suppressor grid 37 and a source of C minus voltage supply. Connected between control grid electrode 25 and cathode 23 is a variable resistor 47. A resistor 49 is connected to grid 33 and said C minus supply. The functions of resistors 47 and 49, condensers 19 and 41 and the parallel series-capacitance network will be more clearly described hereinafter with reference to the operation of circuit. B plus voltage supply is supplied to plates 17, 27 and 39 and screen grid 35 through suitable resistors.

In operation, stage 10 acts as an amplifier amplifying an incoming or received pulse 51 applied to input terminal 12. The values of resistors 47 and 49 and condenser 19 are selected such that they act as a high-pass filter which alters (differentiates) the amplified pulse. Because of inversion of stage 18 and the wave shaping (differentiation) that occurs in said high-pass filter, the start of the pulse apperas as a narrow negative pulse 53, the end as a positive pulse 55, as shown in FIGURE 2*b*. Said pulses 53 and 55 are applied to the suppressor grid 37 and control grid 25. The action of stage 18 is to invert said pulse 53. Resistor 45 and condenser 43 are of such value that they act as a low-pass filter or integrator. The effect of said parallel resistive-capacitive network is to delay the build-up of voltage on suppressor grid 37, thereby acting as a delay line and pulse shaping circuit.

Pentode 29 is normally biased to cut-off requiring positive signals on both control grid 33 and suppressor grid 37 before conduction takes place. The signal 57 (FIGURE 2*c*) at suppressor grid 37 is positive only at a time corresponding to the end of the input pulse. The signal at the suppressor grid 37 is positive when the pulse caused by the start of the incoming signal finally arrives at the end of the delay line. In FIGURE 3, there is shown a typical plot of gain-versus-pulse width for the circuitry of FIGURE 1. By adjustment of resistor 49 and condenser 43, the pulse width for maximum coincidence can be obtained and, therefore, maximum output is attained at this point. This is indicated by dotted curve 63 of FIGURE 3. The rate at which the amplitude of the output pulse 59 (FIGURE 2*d*) appearing at output terminal 50 drops as the width of the input signal is increased can be determined by adjustment of resistors 47 and 49 and condenser 19. (See curve 61 of FIGURE 3.)

The embodiment as shown on FIGURE 1 is most suitable for pulse-length discrimination in which the output is desired to be maximum at a predetermined pulse width. Further, it can be employed to obtain a consistently decreasing amplitude by setting the delay of the low-pass filter to zero as indicated by broken curve 65 of FIGURE 3. Still further, the operation of said circuitry will operate on pulses which are only approximately square.

From the foregoing description, it is seen that a pulse amplifier circuit is provided, the gain of which varies inversely with the width of the input signal. While a particular embodiment of the invention has been shown and described herein, it is not intended that the invention be limited to such disclosure, but that changes and modifications can be made and incorporated within the scope of the claims.

What is claimed is:

1. A pulse amplifier for producing an output pulse, the amplitude of which is proportional to the amplitude of the input signal and inversely proportional to the width of the input signal comprising an amplifier stage for amplifying an incoming signal, an inverter stage, and a coincidence detector stage, differentiating means for coupling said amplifier stage to both said inverter and coincidence detector stage, said differentiating means generating differential pulses of both the leading and trailing edges of the amplified input signal, and integrating means for delaying the differential pulse of the leading edge of the amplifier input signal to said coincidence detector stage.

2. A pulse amplifier comprising an amplifier stage for amplifying an incoming signal, means for producing differential pulses of both the leading and trailing edges of said amplified signal, an inverter stage coupled to said amplifier stage for inverting the differential pulses of said amplified signal, a coincidence detector stage coupled to said amplifier stage and said inverter stage, and integrating means for delaying the application of the differential pulse of the leading edge of said amplified signal to said coincidence detector stage, said coincidence detector stage being conductive only upon the simultaneous arrival of the inverted differential pulse corresponding to the trailing edge of the incoming signal and the delayed differential pulse corresponding to the leading edge of the incoming signal.

3. A pulse amplifier comprising an amplifier stage for amplifying an incoming signal, a high-pass filter for passing the leading and trailing edges of the amplified signal, an inverter stage for inverting the high pass filtered signals whereby the start of the differentiated signal appears as a narrow negative pulse and the end of the signal as a narrow positive pulse, a coincidence detector stage for producing an output pulse the amplitude of which is proportional to the amplitude of the incoming signal, a low-pass filter for delaying the arrival of the pulse corresponding to the leading edge of the incoming signal, said coincidence detector stage goes into conduction only upon the simultaneous arrival of the pulse corresponding to the trailing edge of the incoming signal and the delayed pulse corresponding to the leading edge of the incoming signal.

4. A pulse amplifier comprising a vacuum-tube amplifier stage having at least a cathode, a control grid and a plate, a vacuum tube inverter stage having at least a cathode, a control grid and a plate, said amplifier and inverter stages each having a cathode and plate circuit, a vacuum tube coincidence detector stage having at least cathode, a control grid, a suppressor grid and a plate, said detector stage having a cathode and plate circuit and being so biased that conduction will occur only when positive signals are simultaneously applied to the suppressor and control grids thereof, means including a differentiating circuit for coupling the plate of said amplifier stage to the control grids of said inverter and detector stages, means for coupling the plate of said inverter stage to the suppressor grid of said detector stage, and integrating means connected to the control grid of said detector stage for delaying the output of said amplifier stage to said detector stage.

5. The invenion as defined in claim 4 wherein said differentiating circuit comprises a high-pass filter network including a condenser and a plurality of resistors.

6. The invention as defined in claim 4 wherein said integrating circuit comprises a low-pass filter network including a resistor and condenser connected in parallel.

References Cited in the file of this patent

UNITED STATES PATENTS

| | | |
|---|---|---|
| 2,484,352 | Miller et al. | Oct. 11, 1949 |
| 2,534,264 | Hoeppner | Dec. 19, 1950 |
| 2,648,766 | Eberhard | Aug. 11, 1953 |
| 2,668,236 | McCoy | Feb. 2, 1954 |

UNITED STATES PATENT OFFICE

CERTIFICATE OF CORRECTION

Patent No. 3,015,779 January 2, 1962

Jay G. Levinthal

It is hereby certified that error appears in the above numbered patent requiring correction and that the said Letters Patent should read as corrected below.

Column 4, line 13, for "differentiated" read -- high pass filtered --.

Signed and sealed this 7th day of August 1962.

(SEAL)
Attest:

ERNEST W. SWIDER
Attesting Officer

DAVID L. LADD
Commissioner of Patents